United States Patent
Hirama (10) Patent No.: US 10,611,192 B2
(45) Date of Patent: Apr. 7, 2020

(54) PNEUMATIC TIRE

(71) Applicant: The Yokohama Rubber Co., LTD., Minato-ku, Tokyo (JP)

(72) Inventor: Mitsuru Hirama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 598 days.

(21) Appl. No.: 14/784,867

(22) PCT Filed: Apr. 1, 2014

(86) PCT No.: PCT/JP2014/059652
§ 371 (c)(1),
(2) Date: Oct. 15, 2015

(87) PCT Pub. No.: WO2014/171328
PCT Pub. Date: Oct. 23, 2014

(65) Prior Publication Data
US 2016/0059640 A1 Mar. 3, 2016

(30) Foreign Application Priority Data
Apr. 17, 2013 (JP) ................ 2013-086684

(51) Int. Cl.
*B60C 11/11* (2006.01)
*B60C 11/03* (2006.01)
(Continued)

(52) U.S. Cl.
CPC ...... *B60C 11/0327* (2013.01); *B60C 11/0306* (2013.01); *B60C 11/11* (2013.01); *B60C 11/12* (2013.01); *B60C 11/1236* (2013.01); *B60C 11/0302* (2013.01); *B60C 11/04* (2013.01); *B60C 2011/036* (2013.01);
(Continued)

(58) Field of Classification Search
CPC ......... B60C 11/0302; B60C 2011/0348; B60C 2011/036
See application file for complete search history.

(56) References Cited

U.S. PATENT DOCUMENTS

| | | | | |
|---|---|---|---|---|
| 4,926,919 A | * | 5/1990 | Hopkins | B60C 11/0306 152/209.22 |
| 5,204,036 A | * | 4/1993 | MacMillan | B29D 30/0606 156/95 |

(Continued)

FOREIGN PATENT DOCUMENTS

| | | |
|---|---|---|
| AT | 385953 | 6/1988 |
| EP | 0 768 518 | 4/1997 |

(Continued)

OTHER PUBLICATIONS

English machine translation of JP2010-083462. (Year: 2010).*
(Continued)

*Primary Examiner* — Robert C Dye
(74) *Attorney, Agent, or Firm* — Thorpe North & Western (57) ABSTRACT

Provided is a pneumatic tire in which circumferential narrow grooves are disposed at a tire width direction disposal density of from 0.06 grooves/mm to 0.2 grooves/mm. Width direction narrow grooves include at least one bent portion. The bent portion has a bend angle of not less than 40° and not more than 160°.

20 Claims, 5 Drawing Sheets

(51) Int. Cl.
  *B60C 11/12* (2006.01)
  *B60C 11/04* (2006.01)
(52) U.S. Cl.
  CPC ............ *B60C 2011/0348* (2013.01); *B60C 2011/0353* (2013.01); *B60C 2011/0365* (2013.01); *B60C 2011/0376* (2013.01); *B60C 2011/1209* (2013.01); *B60C 2011/1213* (2013.01); *B60C 2011/1245* (2013.01)

(56) References Cited

U.S. PATENT DOCUMENTS

| | | | |
|---|---|---|---|
| 5,801,304 A | 9/1998 | Cantu et al. | |
| 2003/0019555 A1 | 1/2003 | Nakagawa | |
| 2011/0162768 A1 | 7/2011 | Ochi | |
| 2012/0037289 A1* | 2/2012 | Ochi | B60C 11/11 152/209.18 |
| 2012/0125501 A1* | 5/2012 | Ochi | B60C 11/11 152/209.18 |
| 2013/0000805 A1* | 1/2013 | Oodaira | B60C 11/11 152/209.18 |

FOREIGN PATENT DOCUMENTS

| | | | |
|---|---|---|---|
| JP | 03-010913 | * | 1/1991 |
| JP | 08-318710 | * | 12/1996 |
| JP | 2001-246911 | | 9/2001 |
| JP | 2002-029225 | | 1/2002 |
| JP | 2003-011618 | | 1/2003 |
| JP | 2003-226116 | | 8/2003 |
| JP | 2006-051873 | | 2/2006 |
| JP | 2006-312383 | | 11/2006 |
| JP | 2010-083462 | * | 4/2010 |
| JP | 2013-018450 | | 1/2013 |
| WO | WO 2010-032606 | | 3/2010 |

OTHER PUBLICATIONS

English machine translation of JP03-010913. (Year: 1991).*
English machine translation of JP08-318710. (Year: 1996).*
International Search Report for International Application No. PCT/JP2014/059652 dated Jun. 24, 2014, 2 pages, Japan.

* cited by examiner

PNEUMATIC TIRE

TECHNICAL FIELD

The present technology relates to a pneumatic tire with enhanced braking performance on ice and the like.

BACKGROUND

Conventionally, technology for enhancing the performance of studless tires on ice (braking performance and driving performance) are known (for example, see International Patent Publication No. WO/2010/032606). The pneumatic tire disclosed in International Patent Publication No. WO/2010/032606 includes a tread pattern with a plurality of blocks tightly arranged in a honeycomb-shape.

Generally, when a form of the blocks partitioned by grooves is anisotropic, resistance to external forces tends to increase only in a specified direction, thus enhancing a specific aspect of tire performance. For example, when the resistance to external forces in the tire circumferential direction is boosted making the form of the blocks anisotropic in the tire circumferential direction, braking performance on snow and braking performance on ice are enhanced.

Further, when the form of the grooves that partition the blocks is made anisotropic, drainage performance tends to be enhanced. For example, when the tire width direction grooves with a V-profile are provided, the side of the blocks, partitioned by these grooves, that makes first contact with the ground (leading edge) is the apex of the V shape. Thus, water is efficiently drained from the grooves and drainage performance can be enhanced.

In the pneumatic tire disclosed in International Patent Publication No. WO/2010/032606, the form of the blocks is not anisotropic in any direction. Therefore, it is unclear whether the above-described pneumatic tire provides braking performance on ice, braking performance on snow, and drainage performance in a well-balanced manner.

SUMMARY

The present technology provides a pneumatic tire for which, in particular, braking performance on ice, braking performance on snow, and drainage performance are enhanced in a well-balanced manner.

The pneumatic tire of the present technology includes circumferential main grooves, and is partitioned into rows of small blocks by a plurality of circumferential narrow grooves and a plurality of width direction narrow grooves that intersect with the circumferential narrow grooves. The circumferential narrow grooves are arranged with a tire width direction disposal density not less than 0.06 grooves/mm and not more than 0.2 grooves/mm. The above-described width direction narrow grooves have at least one bent portion. The bend angle at the bent portion is not less than 40° and not more than 160°.

In the pneumatic tire of the present technology, in addition to the disposal density of the circumferential narrow grooves in the tire width direction being enhanced, enhancements have been made, assuming that a bent portion is provided in the width direction narrow grooves, to the bend angle of the bent portion. As a result, the pneumatic tire of the present technology enhances, in particular, braking performance on ice, braking performance on snow, and drainage performance in a well-balanced manner.

BRIEF DESCRIPTION OF THE DRAWINGS

FIGS. 4A and 4B are plan views illustrating a relationship between small blocks B1 that are adjacent in the tire circumferential direction in the pneumatic tire illustrated in FIG. 1 or FIG. 3. FIG. 4A illustrates a case in which the small blocks do not share a tire circumferential direction region. FIG. 4B illustrates a case in which the small blocks share a tire circumferential direction region.

FIGS. 5A and 5B are plan views illustrating a mode of disposing sipes in one of the two small blocks B1 and B2 that are adjacent in the tire circumferential direction as illustrated in FIG. 2. FIG. 5A illustrates an example in which a sipe extends in the tire width direction. FIG. 5B illustrates an example in which a sipe extends parallel to the tire width direction narrow grooves.

DETAILED DESCRIPTION

The following is a detailed description of an embodiment of a pneumatic tire according to the present technology (hereinafter, referred to as the Basic Embodiments and Additional Embodiments 1 to 6), based on the drawings. Note that the present technology is not limited to these embodiments. Furthermore, the constituents of the embodiments include constituents that can be easily replaced by those skilled in the art, and constituents that are substantially the same. In addition, the various modes included in this embodiment can be combined as desired within the scope of obviousness by a person skilled in the art.

[Basic Embodiments]

Basic Embodiments of the pneumatic tire according to the present technology are described below. In the following description, "tire radial direction" refers to a direction orthogonal to the rotational axis of the pneumatic tire; "inner side in the tire radial direction" refers to a side that is near to the rotational axis in the tire radial direction; and "outer side in the tire radial direction" refers to a side that is far from the rotational axis in the tire radial direction. Furthermore, "tire circumferential direction" refers to a circumferential direction having the rotational axis as the center axis. Additionally, "tire width direction" refers to a direction parallel to the rotational axis; "inner side in the tire width direction" refers to a side that is near to a tire equatorial plane CL (tire equator line) in the tire width direction;

and "outer side in the tire width direction" refers to a side that is far from the tire equatorial plane CL in the tire width direction. Note that "tire equatorial plane CL" refers to a plane that is orthogonal to the rotational axis of the pneumatic tire and that passes through the center of the tire width of the pneumatic tire.

(Basic Embodiment 1)

Figure 1:
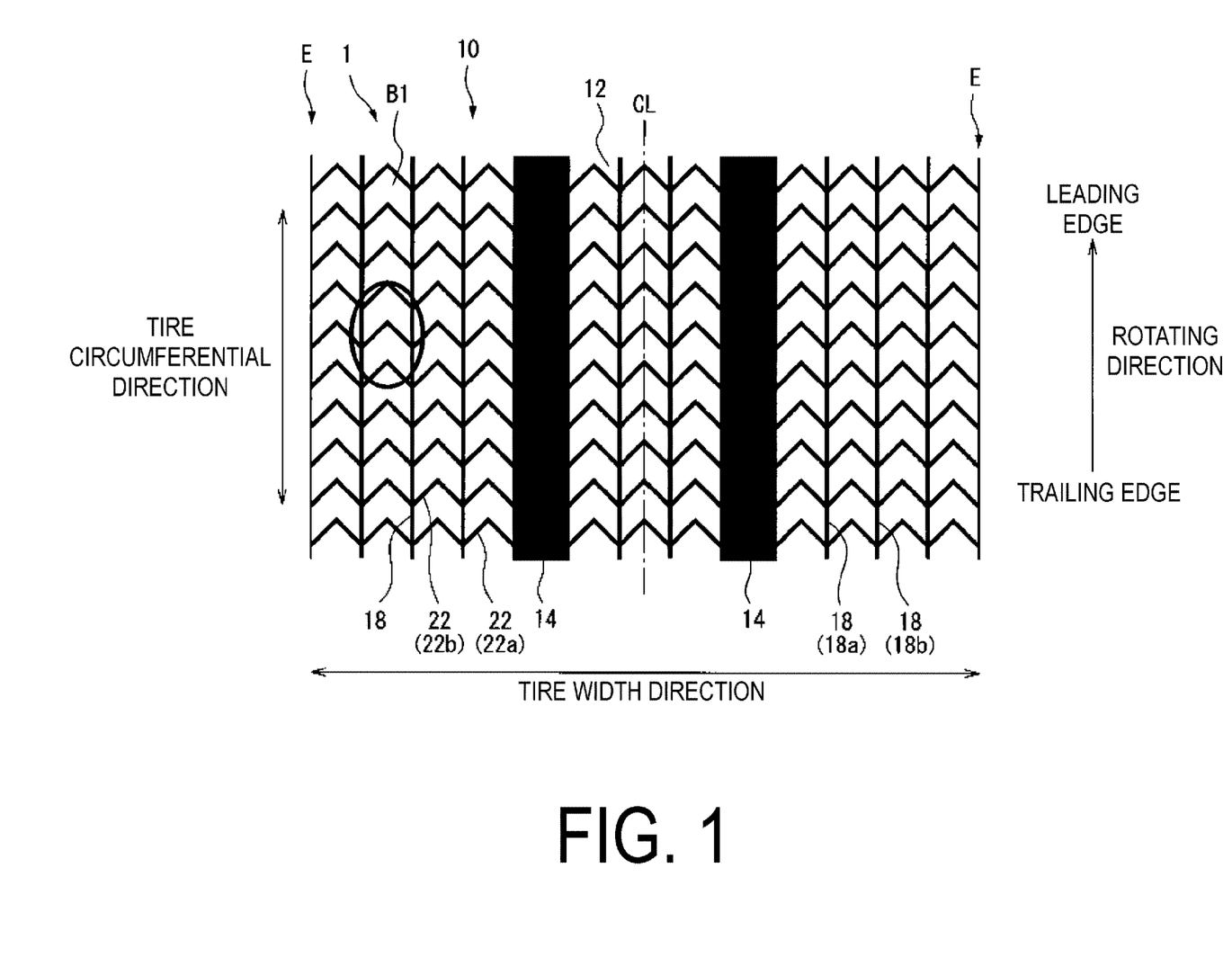
FIG. 1 is a plan view of a tread portion of a pneumatic tire according to an embodiment of the present technology.

The Basic Embodiment 1 is an embodiment in which a pneumatic tire has a specified rotating direction. FIG. 1 is a plan view of a tread portion of a pneumatic tire according to an embodiment of the present technology (tire contacting the ground seen from directly above). The pneumatic tire 1 is a tire for which the rotating direction (tire rolling direction when vehicle is advancing forwards) illustrated in FIG. 1 is fixed. In the pneumatic tire 1, a leading edge illustrated in FIG. 1 contacts the ground before a trailing edge. A tread portion 10 of the pneumatic tire illustrated in FIG. 1 is made of a rubber material (tread rubber), and is exposed at an outermost side of the pneumatic tire 1 in the tire radial direction, the surface thereof forming the profile of the pneumatic tire. The surface of the tread portion 10 forms a tread surface 12 constituting the surface that contacts the road surface when a vehicle (not illustrated) upon which the pneumatic tire 1 is mounted is traveling.

As illustrated in FIG. 1, the tread surface 12 is provided with grooves 14, 18 that extend in the tire circumferential direction, and grooves 22 that are oblique with respect to the tire circumferential direction, thereby forming the tread pattern illustrated in the drawing. The specific configuration of the grooves 14 to 22 is as follows.

Specifically the tread surface 12 is provided with two circumferential main grooves 14 that are symmetrical about the tire equatorial plane CL. Between the two circumferential main grooves 14 and to the outward side in the tire width direction of each circumferential main groove 14, a plurality of circumferential narrow grooves 18, which are narrower than the circumferential main groove 14, is disposed extending in a linear manner in the tire circumferential direction.

Further, in the tread surface 12, between the two circumferential main grooves 14 and to the outward side in the tire width direction of each circumferential main groove 14, a plurality of width direction narrow grooves 22, which are narrower than the circumferential main groove 14, is disposed extending in a zig-zagging manner in the tire width direction.

Accordingly, in the example illustrated in FIG. 1, the plurality of circumferential narrow grooves 18 and the plurality of width direction narrow grooves 22 that intersect with the circumferential narrow grooves 18 form the rows of small blocks in both the tire width direction and the tire circumferential direction. Note, however, that in the present embodiment, in the case of the existence of a circumferential wide groove (in FIG. 1, the circumferential main groove), which is wider than the circumferential narrow groove 18 and extends substantially in the tire circumference direction, land portions formed by partitioning with the circumferential wide grooves are taken to be ribs. Further, in the present embodiment, in the case of the existence, in a tire width direction region in which the width direction narrow grooves 22 are disposed, of further width direction wide grooves (not present in FIG. 1), which are wider than the width direction narrow grooves 22 and extend substantially in the tire width direction, the land portion formed by partitioning with the above-described circumferential wide grooves and the width direction wide grooves are taken to be blocks.

Further, in the present embodiment, the groove width of the circumferential main grooves 14 can be set to be at least 4.0 mm. Here, groove width is used to mean the maximum dimension of a groove in a direction perpendicular to the direction in which the groove extends.

Under this premise, in the present embodiment (Basic Embodiment 1), the circumferential narrow groove 18 is disposed with a tire width direction disposal density of not less than 0.06 grooves/mm and not more than 0.2 grooves/mm. Here, the tire width direction disposal density of the circumferential narrow groove 18 is the number of circumferential narrow grooves 18 per unit length in the tire width direction for the tire width direction region between the two ground contact edges E, as illustrated in FIG. 1.

Further, in the present embodiment, the width direction narrow grooves 22 have at least one, and in the example illustrated in FIG. 1, a plurality of bent portions. Specifically, in the example illustrated in FIG. 1, for every one width direction narrow groove 22, one bent portion is formed between each set of adjacent circumferential narrow grooves 18 (such as between circumferential narrow grooves 18a and 18b).

Figure 2:
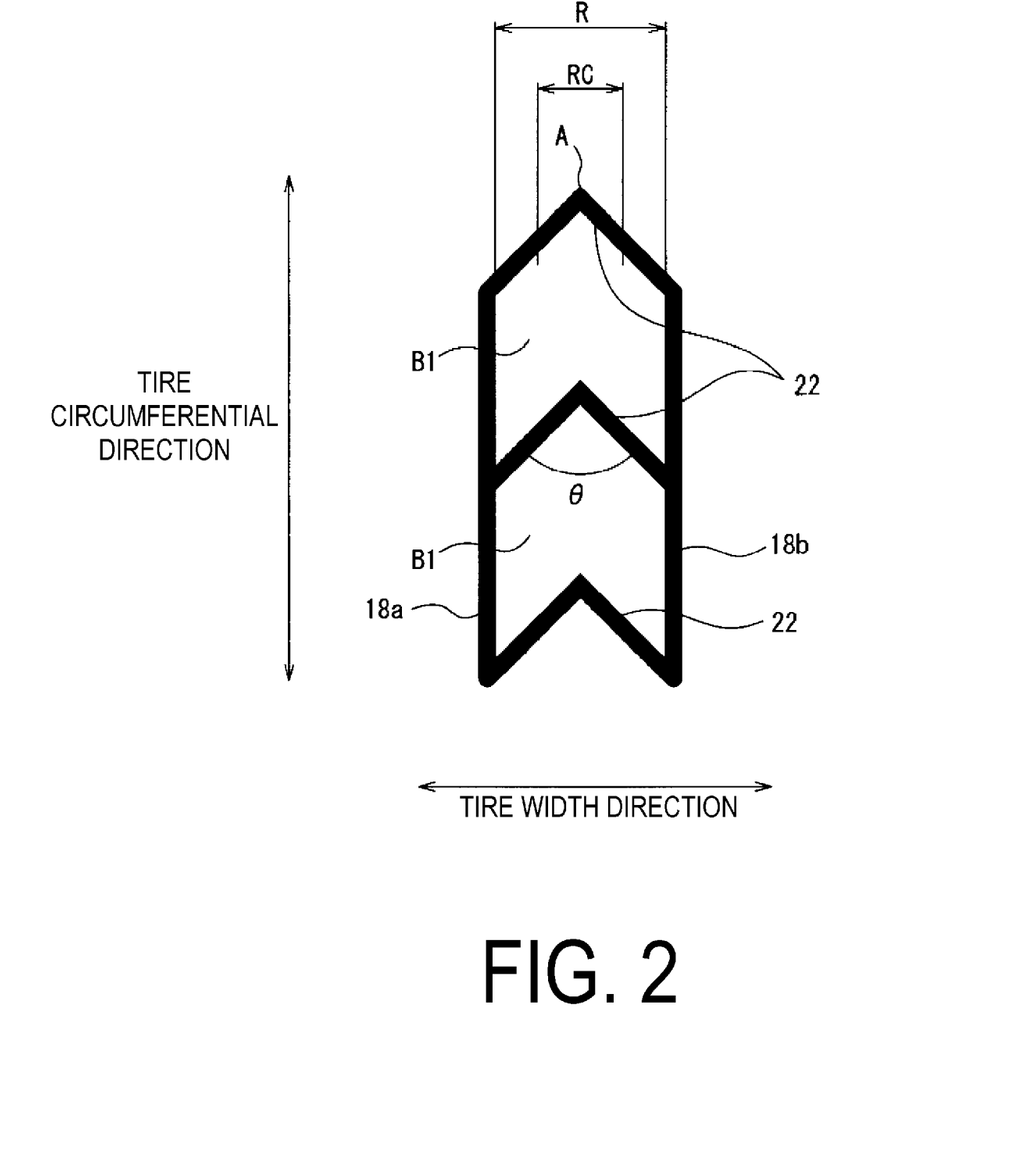
FIG. 2 is an enlarged plan view illustrating a vicinity of an encircled portion of the tread portion illustrated in FIG. 1.

FIG. 2 is an enlarged plan view of the encircled portion of the tread portion illustrated in FIG. 1. In the present embodiment, as illustrated in FIG. 2, a bend angle θ at the bent portion of block B1 is not less than 40° and not more than 160°. The bent portion is not limited to being formed by two straight lines between the circumferential narrow grooves 18a and 18b that are adjacent in the tire width direction, as illustrated in FIG. 2. Though not shown in the drawings, the technology also includes configurations in which the bent portion extends in a curved manner between the circumferential narrow grooves 18a and 18b. When the bent portion extends in a curved manner, the angle is the angle formed between straight lines extending from opposite ends in the tire width direction of the bent portion to the apex of the bent portion.

Effects

In the pneumatic tires of the present embodiment, the circumferential narrow grooves 18 are disposed at a tire width direction disposal density of at least 0.06 grooves/mm. Hence, it is possible to prevent an arrangement whereby the tire circumferential direction length of each small block B1 is too short relative to the tire width direction length. As a result, collapsing of the small blocks B1 in the tire circumferential direction is suppressed and sufficient resistance to external forces in the tire circumferential direction is secured, thus enabling excellent braking performance on ice and excellent braking performance on snow.

Further, in the pneumatic tires of the present embodiment, the circumferential narrow grooves 18 are disposed at a tire width direction disposal density of not more than 0.2 grooves/mm. Hence, it is possible to make the edge formed by the each small block B1 in the tire width direction sufficiently long. As a result, resistance to external forces in the tire circumferential direction is enhanced, thus enabling excellent braking performance on ice and excellent braking performance on snow.

Note also that by setting the tire width direction disposal density of the circumferential narrow grooves 18 to not less than 0.08 grooves/mm and not more than 0.12 grooves/mm, the above-described effects can be exhibited at an even higher level.

Moreover, in the pneumatic tire of the present embodiment, at least one bent portion is provided in the width direction narrow groove 22. Thus, the form of the small block B1 partitioned by the width direction narrow groove 22 is provided with anisotropy. In the case of the example illustrated in FIG. 1, anisotropy in the tire circumferential direction is provided. As a result, resistance to external forces in the tire circumferential direction is increased relative to resistance to external forces in other directions, thus enabling excellent braking performance on ice and excellent braking performance on snow.

In addition, by providing the at least one bent portion in the width direction narrow groove 22 in such a manner, the side of the block B1 that first makes ground contact (leading edge) formed by the partitioning of the width direction narrow groove 22 is a V-shaped apex. Accordingly, water is efficiently drained from the width direction narrow groove 22, and drainage performance can be enhanced.

In addition, in the pneumatic tire of the present embodiment, the bend angle θ of the bent portion is set to at least 40°. Hence, the edges of the small blocks B1 formed by partitioning with the width direction narrow grooves 22 are provided with a sufficient edge component in the tire width direction. As a result, resistance to external forces in the tire circumferential direction can be increased, thus enabling excellent braking performance on ice and excellent braking performance on snow. In addition, in the pneumatic tire of the present embodiment, the bend angle θ of the bent portion is set to be not more than 160°. Hence, the edges of the small blocks B1 formed by partitioning with the width direction narrow grooves 22 are provided with a sufficient edge component in the tire circumferential direction. As a result, resistance to external forces in the tire width direction can be increased, thus enabling excellent turning performance on ice and excellent turning performance on snow.

Note also that by setting the bend angle θ of the bent portion to not more than 60° and not less than 140°, it is possible to achieve the above effects at an even higher level.

As described above, in the pneumatic tires of the present embodiment, in addition to the disposal density of the circumferential narrow grooves in the tire width direction being enhanced, enhancements have been made, assuming that bent portions are provided in the width direction narrow grooves, to the bend angle of the bent portion. As a result, the pneumatic tire of the present embodiment enhances, in particular, braking performance on ice, braking performance on snow and drainage performance in a well-balanced manner.

Note also that although it is not illustrated in the drawings, the pneumatic tire of the present embodiment described above has a meridian cross-section form similar to that of a conventional pneumatic tire. Here, the meridian cross-section form of the pneumatic tire refers to the cross-sectional shape of the pneumatic tire as it appears on a plane normal to the tire equatorial plane CL. The pneumatic tire of the present embodiment, when viewed in meridian cross-section, includes a bead portion, a sidewall portion, a shoulder portion and a tread portion, as one moves from the inner side to the outer side in the tire radial direction. As seen, for example, in meridian cross-section, the pneumatic tire is provided with a carcass layer that extends from the tread portion to the bead portions on both sides and is wound around a pair of bead cores, and a belt layer and a belt reinforcing layer upon the carcass layers in that order outward in the tire radial direction.

The pneumatic tire according to the present embodiment can be obtained via ordinary manufacturing steps; i.e., a tire material mixing step, a tire material machining step, a green tire molding step, a vulcanization step, a post-vulcanization inspection step, etc. In particular, when manufacturing the pneumatic tire according to the present embodiment, recesses and protrusions corresponding to the tread pattern illustrated in FIG. 1 are formed on the inner wall of the vulcanization mold, which is used to perform vulcanization.

(Basic Embodiment 2)

Figure 3:
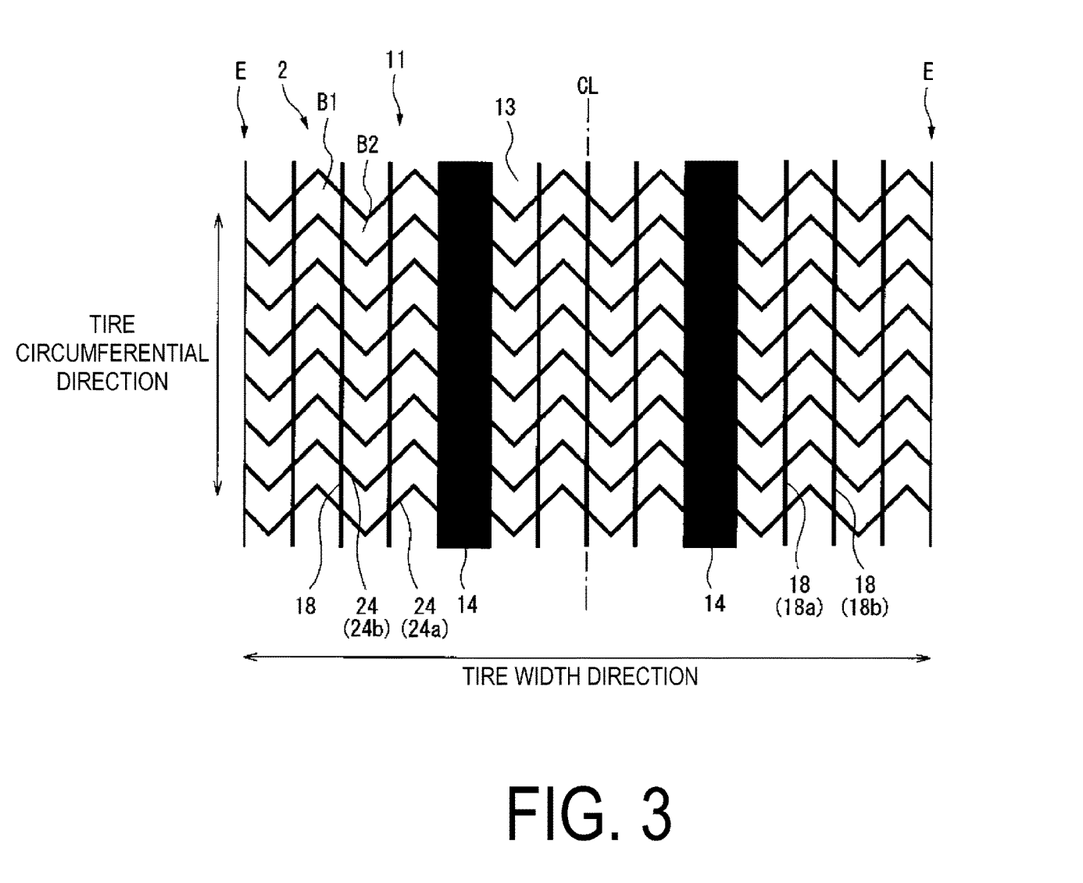
FIG. 3 is a plan view of a tread portion of a pneumatic tire according to an embodiment of the present technology.

The Basic Embodiment 2 is an embodiment in which a pneumatic tire has an unspecified rotating direction. FIG. 3 is a plan view of a tread portion of a pneumatic tire according to an embodiment of the present technology (tire contacting the ground seen from directly above). As illustrated in the same drawing, the pneumatic tire 2 includes a tread pattern that is symmetrical about the tire equatorial plane CL. Of the reference numbers in FIG. 3, those that are identical to the reference numbers in FIG. 1 indicate constituents that are identical to those of FIG. 1.

The tread portion 11 of the pneumatic tire 2 illustrated in FIG. 3 is made of a rubber material (tread rubber), and, as in the basic embodiment 1 illustrated in FIG. 1, is exposed at an outermost side of the tire radial direction of the pneumatic tire 2, the surface of the tread portion 11 forming the profile of the pneumatic tire. The surface of the tread portion 11 forms a tread surface 13 constituting the surface that contacts the road surface when a vehicle (not illustrated) upon which the pneumatic tire 2 is mounted is traveling.

In the example illustrated in FIG. 3, the plurality of circumferential narrow grooves 18 and the plurality of width direction narrow grooves 24 that intersect with the circumferential narrow grooves 18 form the rows of small blocks in both the tire width direction and the tire circumferential direction.

Under this premise, in the present embodiment (Basic Embodiment 2), the circumferential narrow grooves 18 are disposed with a tire width direction disposal density of not less than 0.06 grooves/mm and not more than 0.2 grooves/mm. Further, the width direction narrow groove 24 includes at least one bent portion, and in the example illustrated in FIG. 1 a plurality of bent portions, the bent portions having a bend angle θ of at least 40°.

As described above, in the pneumatic tire of the Basic Embodiment 2, in addition to the disposal density of the circumferential narrow grooves in the tire width direction being enhanced, enhancements have been made, assuming that bent portions are provided in the width direction narrow grooves, to the bend angle of the bent portion. As a result, the pneumatic tire of the present embodiment enhances, in particular, braking performance ice, braking performance on snow and drainage performance in a well-balanced manner.

[Additional Embodiments]

Next, descriptions are made of Additional Embodiments 1 to 7 which can be optionally implemented as opposed to Basic Embodiments of the pneumatic tire according to the present technology described above.

(Additional Embodiment 1)

In the basic embodiments (Basic Embodiments 1 and 2), the spacing of the width direction narrow grooves 22 (24) in FIGS. 1 and 3 is preferably from 0.8 to 1.5 times the spacing of the circumferential narrow grooves 18 (Additional Embodiment 1).

Here, the spacing of the width direction narrow grooves 22 (24) refers to a distance between the groove width direction center lines of the width direction narrow grooves 22a, 22b, (24a, 24b) that are adjacent in the tire circumferential direction. Similarly, the spacing of the circumferential direction narrow grooves 18 refers to a distance between the groove width direction center lines of the circumferentail direction narrow grooves 18a, 18b that are adjacent in the tire width direction. Note also that the groove width direction center line refers to a line that passes through a center point of a groove width measured in a direction perpendicular to the groove extension direction.

By setting the spacing of the width direction narrow groves 22a, 22b (24a, 24b) to at least 0.8 times the spacing of the circumferential narrow grooves 18a, 18b, it is possible to further suppress the situation whereby the tire circumferential length of each small block B1 (B2) is excessively short in comparison to the tire width direction length. As a result, collapsing of the small blocks B1 (B2) in the tire circumferential direction is suppressed and the resistance to external forces in the tire circumferential direction is further enhanced, further enhancing braking performance on ice and braking performance on snow.

Moreover, by setting the spacing of the width direction narrow groves 22a, 22b (24a, 24b) to not more than 1.5 times the spacing of the circumferential narrow grooves 18a, 18b, it is possible to further lengthen the edge of the small blocks B1 (B2) extending in the tire width direction. As a result, the resistance to external forces in the tire circumferential direction is further enhanced, and braking performance on ice and braking performance on snow can be further enhanced.

Note also that by setting the spacing of the width direction narrow grooves 22 (24) to be not less than 1.0 times and not more than 1.2 times that of the circumferential narrow grooves 18, the above-described effects can be achieved at an even higher level.

(Additional Embodiment 2)

In an embodiment additional to the Basic Embodiments and Additional Embodiment 1, the apex of the bent portion in FIGS. 1 and 3 preferably exists in a central portion region occupying 50% of the tire width direction region of the bent portion (Additional Embodiment 2).

The central portion region occupying 50% of the tire width direction region of the bent portion refers to, as illustrated in FIG. 2, when looking at one bent portion, a region RC occupying a central portion region occupying 50% of the tire width direction of the tire width direction region R, which extends from one width direction side to the other width direction side of the bent portion.

As illustrated in FIG. 2, by locating an apex A of the bent portion in the region RC, it is possible to prevent a situation whereby the magnitudes of the tire width direction edge component and the tire circumferential direction edge component differ excessively for the edge formed by a groove section to one tire width direction side of the apex A and the edge formed by a groove section on the other tire width direction side, which link to form the same small block. Accordingly, differences in the resistance provided by the above-described two edges against external forces in the tire width direction and differences in the resistance provided by the above-described two edges against external forces in the tire circumferential direction can be suppressed. As a result, it is possible to suppress the collapse of the small block B1 in both the tire width direction and in the tire circumferential direction at both tire width direction sides of the apex A in a well-balanced manner, and to further enhance turning performance on ice and snow and braking performance on ice and snow.

By locating the apex of the bent portion in the central portion region occupying 25% of the tire width direction region of the bent portion, the above effect can be exhibited at an even higher level.

(Additional Embodiment 3)

In an additional embodiment of the Basic Embodiments and any one of the Additional Embodiments 1 and 2, it is preferable that the groove width of the circumferential narrow grooves 18 in FIGS. 1 and 3 is not less than 1.0 mm and less than 4.0 mm (Additional Embodiment 3). Here, the groove width of the circumferential narrow groove 18 is a groove dimension measured perpendicular to the extension direction of the circumferential narrow groove 18.

By setting the groove width of the circumferential narrow groove 18 to be at least 1.0 mm, water drainage performance on ice can be further enhanced. Also, by keeping the above-described groove width to less than 4.0 mm, the blocks B1 (blocks B2) that are adjacent in the tire width direction and formed by partitioning with a common circumferential narrow groove 18 make contact and support each other when an external force is applied in the tire width direction. Accordingly, collapse of the small blocks B1 (B2) in the tire width direction is suppressed, making it possible to realize excellent turning performance on ice and excellent turning performance on snow.

Note also that by setting the groove width of the circumferential narrow grooves 18 to not less than 2.0 mm and not more than 3.0 mm, the above-described effects can be exhibited at an even higher level.

(Additional Embodiment 4)

In an additional embodiment of the Basic Embodiments and any one of the Additional Embodiments 1 to 3, it is preferable that the groove width of the width direction narrow grooves 22 (24) in FIGS. 1 and 3 is at least 1.0 mm and less than 4.0 mm (Additional Embodiment 4). Here, the groove width of the width direction narrow groove 22 (24) is a groove dimension measured perpendicular to the extension direction of the width direction narrow groove 22 (24).

By setting the groove width of the width direction narrow groove 22 (24) to at least 1.0 mm, it is possible not only to further enhance drainage performance on ice, but also to enhance snow column shear force on snow and thereby realize excellent braking performance on snow. Also, by keeping the groove width of the width direction narrow groove 22 (24) to less than 4.0 mm, the small blocks B1 (small blocks B2) make contact and support each other when an external force is applied in the tire circumferential direction. As a result, collapsing of the small blocks B1 (B2) in the tire circumferential direction is suppressed, and braking performance on ice and braking performance on snow can be further enhanced.

Note also that by setting the groove width of the width direction narrow grooves 22 (24) to not less than 2.0 mm and not more than 3.0 mm, the above-described effects can be exhibited at an even higher level.

(Additional Embodiment 5)

In an additional embodiment of the Basic Embodiments and any one of the Additional Embodiments 1 to 4, it is preferable that the small blocks B1 (small blocks B2) in FIGS. 1 and 3 that are adjacent in the tire circumferential direction share the same tire circumferential direction region (Additional Embodiment 5).

Figure 4A:
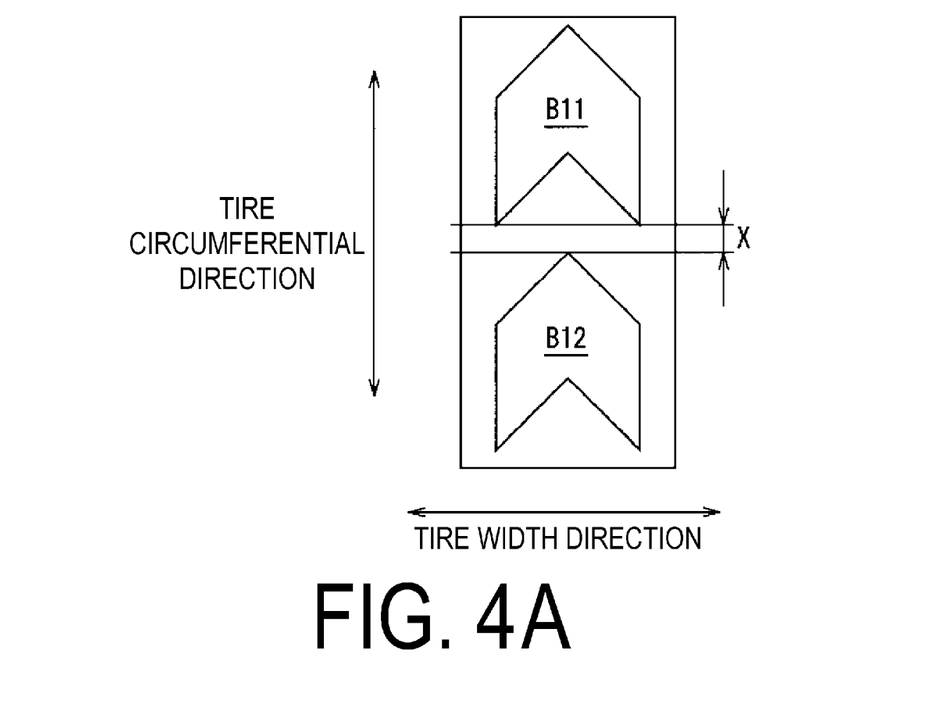
Figure 4B:
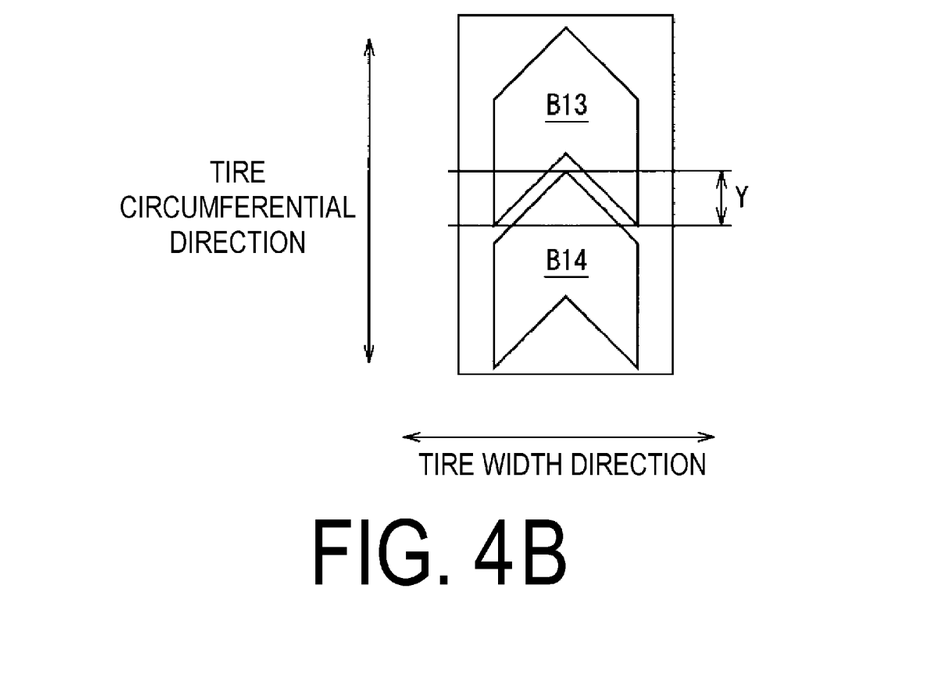

FIGS. 4A and 4B are plan views illustrating a relationship between the blocks B1 that are adjacent in the tire circumferential direction in the pneumatic tire illustrated in FIG. 1 or FIG. 3. FIG. 4A illustrates a case in which the small blocks do not share the same tire circumferential direction region, and FIG. 4B illustrates a case in which the small blocks share the same tire circumferential direction region. In FIGS. 4A and 4B, regions outside the small blocks B1 (B11, B12, B13, B14) are regions of grooves that partition the small blocks B1. Note also that while the examples of FIGS. 4A and B are examples of the blocks B1 of FIGS. 1 and 3, the following explanation of the blocks B1 is also applicable to the blocks B2 in FIG. 3.

In the example illustrated in FIG. 4A, only grooves exist in a tire circumferential direction region (a region extending in the tire width direction indicated by tire circumferential line portion X in FIG. 4A) between the chevron back edge of the chevron-like small block B11, which is anisotropic in the tire circumferential direction, and the chevron tip edge of the chevron-like small block B12, which is also anisotropic in the tire circumferential direction. Thus, in the example of FIG. 4A, the small blocks B11 and B12 do not share the same tire circumferential direction region.

By contrast in the example illustrated in FIG. 4B, besides grooves, portions of the small blocks B13 and B14 also exist in the tire circumferential direction region between the chevron back edge of the chevron-like small block B13, which is anisotropic in the tire circumferential direction, and the chevron tip edge of the chevron-like small block B14, which is also anisotropic in the tire circumferential direction (a region extending in the tire width direction indicated by tire circumferential line portion Y in FIG. 4B). Thus, in the example of FIG. 4B, the blocks B13 and B14 share the same tire circumferential direction region.

In the present embodiment (Additional Embodiment 5), the arrangement shown in FIG. 4B assumed. In the example shown in FIG. 4B the groove sandwiched between the small blocks B13 and B14 has a smaller tire circumferential direction dimension than that illustrated in FIG. 4A. Hence, when an external force in the tire circumferential direction is applied to the small blocks B13 and B14, the small blocks B13 and B14 make contact in region Y and support each other. As a result, collapsing of the small blocks B13 and B14 in the tire circumferential direction is further suppressed, and braking performance on ice and braking performance on snow can be further enhanced.

Similarly, in the example illustrated in FIG. 4B, the groove sandwiched between the small blocks B13 and B14 has a smaller tire width direction dimension than that illustrated in FIG. 4A. Hence, when an external force in the tire width direction is applied to the small blocks B13 and B14, the small blocks B13 and B14 support each other at region Y. As a result, collapsing of the small blocks B13 and B14 in the tire width direction is further suppressed, and turning performance on ice and turning performance on snow can be further enhanced.

(Additional Embodiment 6)

In an additional embodiment of the Basic Embodiments and any one of the Additional Embodiments 1 to 5, it is preferable that at least one of the small blocks B1 and B2 in FIGS. 1 and 3 has formed therein at least one sipe (Additional Embodiment 6). Here, sipe refers to a groove having a groove width of at least 0.4 mm and less than 1.0 mm.

By forming at least on sipe in at least one of the small blocks B1 and B2, it is possible to further increase an amount of edge in the small block groups formed from the small blocks. Accordingly, when the edges include more tire circumferential direction components due to the formation of the sipes, the resistance to external forces in the tire width direction are further increased, and turning performance on ice and turning performance on snow can be greatly enhanced. Moreover when the edges include more tire width direction components due to the formation of the sipes, the resistance to external forces in the tire circumferential direction are further increased, and braking performance on ice and braking performance on snow can be greatly enhanced.

Figure 5A:
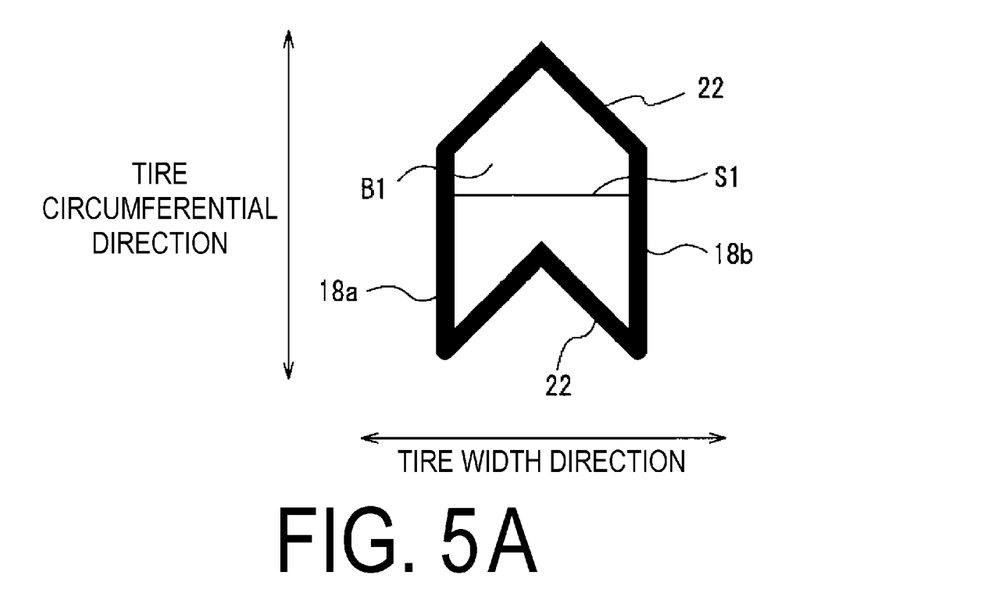
Figure 5B:
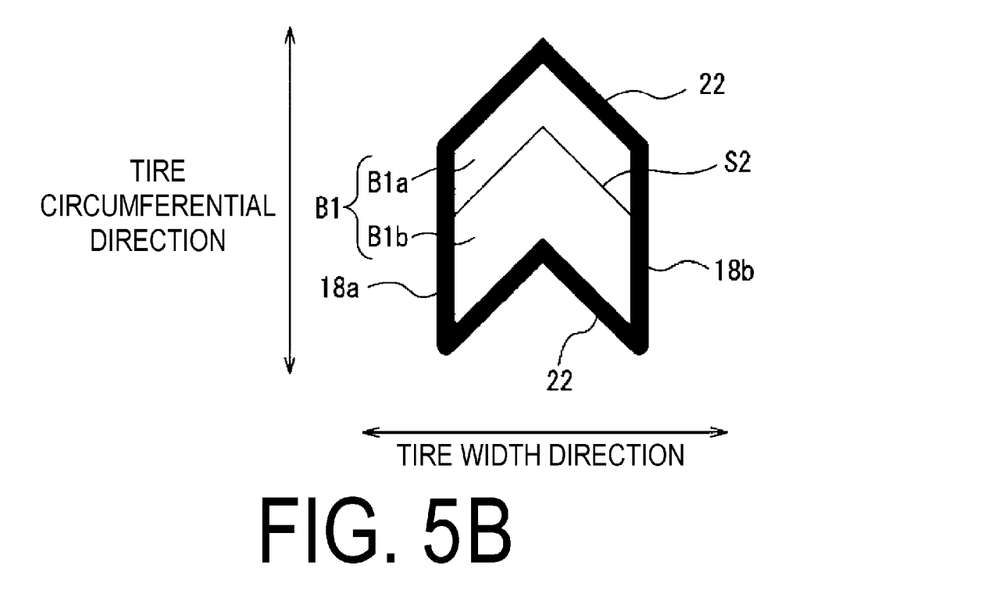

FIGS. 5A and 5B are plan views illustrating modes of disposing sipes in one of the two blocks B1 and B2 that are adjacent in the tire circumferential direction, as illustrated in FIG. 2. FIG. 5A illustrates an example in which a sipe S1 extends in the tire width direction, and FIG. 5B illustrates an example in which a sipe S2 extends parallel to the tire width direction narrow grooves 22. In the present embodiment, there is no particular limit on the disposal of the sipes. For example, as illustrated in FIG. 5A, when the sipe S1 is extended in the tire width direction, the tire width direction component of the edge formed by the sipes is maximized, thus maximizing the resistance to external forces in the tire circumferential direction, and enabling a very large enhancement in braking performance on ice and braking performance on snow. Moreover, as illustrated in FIG. 5B, when the sipe S2 is extended parallel to the width direction narrow grooves 22, the single chevron-like small block B1 is divided by sipe S2 into the same shape. The small block piece B1a and small block piece B1b resulting from the division by the sipe S2 have substantially the same action against external forces in the tire circumferential direction and external forces in the tire width direction. Hence, uneven wear such as localized heel-and-toe wear in proximity to sipe S2 is suppressed and tire durability can be further enhanced.

WORKING EXAMPLES

Pneumatic tires of Working Examples 1 to 14 were prepared according to the following: tire size 205/55R16, tread pattern of one of those illustrated in FIGS. 1 and 3; and conditions shown in Table 1. These conditions include: tire width direction disposal density of circumferential narrow grooves (circumferential narrow groove density), bend angle of bent portion (bend angle), spacing of width direction narrow grooves with respect to spacing of circumferential narrow grooves (spacing ratio), apex of bent portion located or not located in central portion region occupying 50% (specified region) of tire width direction region (bent portion region); groove width of circumferential narrow grooves; groove width of width direction narrow grooves; whether or not the small blocks adjacent in the circumferential direction share the same tire circumferential direction region (presence of shared tire circumferential region); and formation or not of at least one sipe in the small block (presence of sipe). Note that the example of FIG. 1 has a specified tire rotating direction and the example of FIG. 3 does not have a specified tire rotating direction.

For comparison a pneumatic tire of a Conventional Example was prepared having a tire size of 205/55R16 and the same tread pattern as Working Example 1 except in the width direction narrow grooves did not include a bent portion but instead extended linearly in the tire width direction.

The Working Examples 1 to 14 and the Conventional Example prepared in this manner were fitted to a 16×6.5 J rim at an air pressure of 230 kPa and installed on a sedan vehicle with an 1800 cc engine capacity. Evaluation of braking performance on ice, braking performance on snow and water drainage performance was then performed. The results are shown on Table 1.

(Braking Performance On Ice)

On an icy road surface, braking distance was measured at a speed of 40 km/h, and index evaluation was performed with the Conventional Example as the standard (100). In this evaluation, a larger index value represents a better braking performance on ice.

(Braking Performance On Snow)

On a road surface of compacted snow, braking distance was measured at a speed of 40 km/h, and index evaluation was performed with the Conventional Example as the standard (100). In this evaluation, a larger index value represents a better braking performance on snow.

(Drainage Performance)

In a process of acceleration from a standing start on a wet road surface with a water depth of 5 mm, the speed at which the tires lost grip and raced was measured and index evaluation was performed with the Conventional Example as the standard (100). In this evaluation, a larger index value represents a better drainage performance.

TABLE 1

|  | Conventional Example | Working Example 1 | Working Example 2 | Working Example 3 | Working Example 4 | Working Example 5 | Working Example 6 | Working Example 7 |
|---|---|---|---|---|---|---|---|---|
| Tread pattern | — | FIG. 1 | FIG. 1 | FIG. 1 | FIG. 1 | FIG. 1 | FIG. 1 | FIG. 1 |
| Circumferential narrow groove density [grooves/mm] | 0.1 | 0.1 | 0.1 | 0.1 | 0.1 | 0.1 | 0.1 | 0.1 |
| Bend angle [°] | — | 100 | 100 | 100 | 100 | 100 | 100 | 100 |
| Spacing ratio [times] | 0.7 | 0.7 | 1.0 | 1.0 | 1.0 | 1.0 | 1.0 | 1.0 |
| Bend angle region |  | Outside specified region | Outside specified region | Inside specified region | Inside specified region | Inside specified region | Inside specified region | Inside specified region |
| Groove width of circumferential narrow grooves [mm] | 0.9 | 0.9 | 0.9 | 0.9 | 2.0 | 2.0 | 2.0 | 2.0 |
| Groove width of width direction narrow grooves [mm] | 0.9 | 0.9 | 0.9 | 0.9 | 0.9 | 2.0 | 2.0 | 2.0 |
| Presence/absence of shared circumferential direction region | None | None | None | None | None | None | Present | Present |
| Presence/absence of the sipes | None | None | None | None | None | None | None | Present |
| Braking performance on ice | 100 | 103 | 105 | 108 | 110 | 110 | 115 | 120 |
| Braking performance on snow | 100 | 102 | 103 | 105 | 108 | 110 | 112 | 115 |
| Drainage performance: | 100 | 105 | 108 | 110 | 112 | 114 | 114 | 118 |

|  | Conventional Example | Working Example 8 | Working Example 9 | Working Example 10 | Working Example 11 | Working Example 12 | Working Example 13 | Working Example 14 |
|---|---|---|---|---|---|---|---|---|
| Tread pattern | — | FIG. 3 | FIG. 3 | FIG. 3 | FIG. 3 | FIG. 3 | FIG. 3 | FIG. 3 |
| Circumferential narrow groove density [grooves/mm] | 0.1 | 0.1 | 0.1 | 0.1 | 0.1 | 0.1 | 0.1 | 0.1 |
| Bend angle [°] | — | 100 | 100 | 100 | 100 | 100 | 100 | 100 |
| Spacing ratio [times] | 0.7 | 0.7 | 1.0 | 1.0 | 1.0 | 1.0 | 1.0 | 1.0 |
| Bend angle region |  | Outside specified region | Outside specified region | Inside specified region | Inside specified region | Inside specified region | Inside specified region | Inside specified region |
| Groove width of circumferential narrow grooves [mm] | 0.9 | 0.9 | 0.9 | 0.9 | 2.0 | 2.0 | 2.0 | 2.0 |
| Groove width of width direction narrow grooves [mm] | 0.9 | 0.9 | 0.9 | 0.9 | 0.9 | 2.0 | 2.0 | 2.0 |
| Presence/absence of shared circumferential direction region | None | None | None | None | None | None | Present | Present |
| Presence/absence of the sipes | None | None | None | None | None | None | None | Present |
| Braking performance on ice | 100 | 105 | 107 | 110 | 112 | 112 | 117 | 122 |
| Braking performance on snow | 100 | 104 | 105 | 107 | 110 | 112 | 114 | 117 |
| Drainage performance: | 100 | 103 | 106 | 108 | 110 | 112 | 112 | 116 |

Note that in Table 1, for the "bent portion region" item, "outside specified region" refers to the apex A in FIG. 2 being located in the 20% of the bent portion tire width direction region from the narrow groove 18a, and "inside specified region" refers to the apex A in FIG. 2 being located in the 50% of the bent portion tire width direction region from the narrow groove 18a. Further, for the "presence of shared tire circumferential direction region" item, "none" refers to when the dimension X in FIG. 4A is 0.1 [mm], and "present" refers to the when the dimension Y in FIG. 4B is 1.0 mm. Moreover, for the "presence of sipe" item, "present" refers to when the small blocks have a sipe S2 of the form illustrated in FIG. 5B formed therein.

According to Table 1, the pneumatic tires of Working Examples 1 to 14 within the technical scope of the present technology (with enhanced disposal density of the circumferential narrow grooves in the tire width direction and enhanced bend angle of the bent portion) were all determined to offer a well-balanced enhancement in braking performance on ice, braking performance on snow, and water drainage performance over the pneumatic tire of the Conventional Example that is outside the scope of the present technology.

What is claimed is:

1. A pneumatic tire, comprising:
   a circumferential main groove; and
   a row of small blocks formed by partitioning with a plurality of circumferential narrow grooves and a plurality of width direction narrow grooves that intersect with the circumferential narrow grooves,
   the row of small blocks being centered on a tire centerline,
   the circumferential narrow grooves being straight grooves and being disposed with a tire width direction disposal density of not less than 0.06 grooves/mm and not more than 0.2 grooves/mm,
   the width direction narrow grooves including at least one bent portion, and
   a bend angle at the bent portion being not less than 40° and not more than 160°.

2. The pneumatic tire according to claim 1, wherein a spacing of the width direction narrow grooves is not less than 0.8 times and not more than 1.5 times a spacing of the circumferential narrow grooves.

3. The pneumatic tire according to claim 2, wherein an apex of the bent portion is located in a central portion region occupying 50% of a tire width direction region of the bent portion.

4. The pneumatic tire according to claim 3, wherein a groove width of the circumferential narrow grooves is at least 1.0 mm and less than 4.0 mm.

5. The pneumatic tire according to claim 4, wherein a groove width of the width direction narrow grooves is at least 1.0 mm and less than 4.0 mm.

6. The pneumatic tire according to claim 5, wherein the small blocks that are adjacent in the tire circumferential direction share a same tire circumferential direction region.

7. The pneumatic tire according to claim 6, wherein at least any one of the small blocks includes at least one sipe formed therein.

8. The pneumatic tire according to claim 1, wherein an apex of the bent portion is located in a central portion region occupying 50% of a tire width direction region of the bent portion.

9. The pneumatic tire according to claim 1, wherein a groove width of the circumferential narrow grooves is at least 1.0 mm and less than 4.0 mm.

10. The pneumatic tire according to claim 1, wherein a groove width of the width direction narrow grooves is at least 1.0 mm and less than 4.0 mm.

11. The pneumatic tire according to claim 1, wherein the small blocks that are adjacent in the tire circumferential direction share a same tire circumferential direction region.

12. The pneumatic tire according to claim 1, wherein at least any one of the small blocks includes at least one sipe formed therein.

13. The pneumatic tire according to claim 1, wherein the width direction narrow grooves have a same width in the tire circumferential direction as a width of the circumferential narrow grooves in the width direction.

14. The pneumatic tire according to claim 1, wherein the bend angle at the bent portion is not less than 40° and not more than 110°.

15. The pneumatic tire according to claim 1, wherein the bend angle at the bent portion is not less than 140° and not more than 160°.

16. The pneumatic tire according to claim 1, wherein a corner of the bent portion points in a direction parallel to the tire circumferential direction.

17. The pneumatic tire according to claim 1, wherein a spacing of the width direction narrow grooves is not less than 0.8 times and not more than 1.2 times a spacing of the circumferential narrow grooves.

18. The pneumatic tire according to claim 1, wherein a groove width of the width direction narrow grooves is at least 1.0 mm and less than 1.9 mm.

19. The pneumatic tire according to claim 1, wherein the bend angle at the bent portion is not less than 142° and not more than 160°.

20. A pneumatic tire, comprising:
    a circumferential main groove; and
    a row of small blocks formed by partitioning with a plurality of circumferential narrow grooves and a plurality of width direction narrow grooves that intersect with the circumferential narrow grooves,
    the circumferential narrow grooves being straight grooves and being disposed with a tire width direction disposal density of not less than 0.06 grooves/mm and not more than 0.2 grooves/mm,
    the width direction narrow grooves including at least one bent portion,
    a bend angle at the bent portion being not less than 40° and not more than 160°, and
    a spacing of the width direction narrow grooves being not less than 0.8 times and not more than 1.2 times a spacing of the circumferential narrow grooves.

* * * * *